(12) United States Patent
Messana et al.

(10) Patent No.: US 11,401,367 B2
(45) Date of Patent: Aug. 2, 2022

(54) FUNCTIONALIZED ACCELERATING RESINS DERIVED FROM RENEWABLE MATERIALS

(71) Applicant: Henkel AG & Co. KGaA, Duesseldorf (DE)

(72) Inventors: Andrew D. Messana, Newington, CT (US); David P. Dworak, Middletown, CT (US); Anthony F. Jacobine, North Haverhill, NH (US); Darel Gustafson, Shelton, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 197 days.

(21) Appl. No.: 16/002,488

(22) Filed: Jun. 7, 2018

(65) Prior Publication Data
US 2018/0282467 A1    Oct. 4, 2018

Related U.S. Application Data

(63) Continuation of application No. PCT/US2016/062822, filed on Nov. 18, 2016.

(60) Provisional application No. 62/264,623, filed on Dec. 8, 2015.

(51) Int. Cl.
| | |
|---|---|
| *C08G 18/32* | (2006.01) |
| *C08G 18/75* | (2006.01) |
| *C08G 18/36* | (2006.01) |
| *C08F 220/06* | (2006.01) |
| *C08G 18/66* | (2006.01) |
| *C08G 18/24* | (2006.01) |
| *C08G 18/42* | (2006.01) |
| *C08G 18/81* | (2006.01) |
| *C08G 18/67* | (2006.01) |
| *C08G 18/80* | (2006.01) |
| *C08G 18/38* | (2006.01) |
| *C08G 18/83* | (2006.01) |
| *C08F 290/06* | (2006.01) |
| *C08F 222/10* | (2006.01) |

(52) U.S. Cl.
CPC ........ *C08G 18/3293* (2013.01); *C08F 220/06* (2013.01); *C08F 290/067* (2013.01); *C08G 18/246* (2013.01); *C08G 18/3206* (2013.01); *C08G 18/36* (2013.01); *C08G 18/3844* (2013.01); *C08G 18/4238* (2013.01); *C08G 18/6651* (2013.01); *C08G 18/672* (2013.01); *C08G 18/755* (2013.01); *C08G 18/8051* (2013.01); *C08G 18/8175* (2013.01); *C08G 18/831* (2013.01); *C08G 18/832* (2013.01); *C08F 222/1065* (2020.02)

(58) Field of Classification Search
CPC ............. G08G 18/3293; G08G 18/246; G08G 18/3206; G08G 18/36; G08G 18/3844; G08G 18/4238; G08G 18/6651; G08G 18/672; G08G 18/755; G08G 18/8051; G08G 18/8175; G08G 18/832

See application file for complete search history.

(56) References Cited

U.S. PATENT DOCUMENTS

| | | | |
|---|---|---|---|
| 6,509,086 B1 * | 1/2003 | Schroder | B32B 27/30 |
| | | | 428/212 |
| 6,835,762 B1 | 12/2004 | Kelmarczyk et al. | |
| 6,891,053 B2 | 5/2005 | Chasar et al. | |
| 7,928,161 B2 | 4/2011 | Bhattacharjee et al. | |
| 8,188,161 B1 | 5/2012 | Messana | |
| 8,481,659 B2 | 7/2013 | Birkett et al. | |
| 8,575,378 B2 | 11/2013 | Garrett et al. | |
| 8,722,815 B2 | 5/2014 | Huang et al. | |
| 8,757,294 B2 | 6/2014 | Johnson et al. | |
| 2002/0132118 A1 | 9/2002 | Hirai et al. | |
| 2009/0012202 A1 | 1/2009 | Jacobine et al. | |
| 2009/0278084 A1 | 11/2009 | Messana et al. | |
| 2011/0187970 A1 | 8/2011 | Kim et al. | |
| 2012/0157641 A1 | 6/2012 | Birkett et al. | |
| 2013/0096251 A1 | 4/2013 | Popa et al. | |
| 2014/0045969 A1 * | 2/2014 | Klapdohr | C09J 11/06 |
| | | | 523/122 |
| 2016/0168412 A1 | 6/2016 | Caillouette et al. | |

FOREIGN PATENT DOCUMENTS

| | | |
|---|---|---|
| CN | 101048436 | 10/2007 |
| CN | 102702469 A * | 10/2012 |
| CN | 103080171 | 5/2013 |
| CN | 103396342 A * | 11/2013 |
| EP | 2518095 A1 | 10/2012 |
| WO | 2009005835 A2 | 1/2009 |

(Continued)

OTHER PUBLICATIONS

Kaibin Li et al.: Preparation and properties of castor oil/pentaerythritol triacrylate-based UV curable waterborne polyurethane acrylate, Progress in Organic Coatings, vol. 78, Oct. 12, 2014, pp. 146-154.

*Primary Examiner* — Ling Siu Choi
*Assistant Examiner* — David L Miller
(74) *Attorney, Agent, or Firm* — Steven C. Bauman

(57) ABSTRACT

The present invention relates to curable polyurethane polymers made from renewable materials and having polymerization accelerator groups built into the polymer. In particular hydroxylated oleaginous materials derived from plant oils, such as soybean oil, are used. These renewable materials may be formed into curable polyurethane polymers having different chemical functionalities and cure mechanisms.

8 Claims, No Drawings

(56) References Cited

FOREIGN PATENT DOCUMENTS

| WO | WO-2009155086 A2 * | 12/2009 | ............. C08G 12/32 |
|----|----|----|----|
| WO | 2010127053 | 11/2010 | |
| WO | 2015013064 A1 | 1/2015 | |
| WO | 2017066539 | 4/2017 | |

* cited by examiner

FUNCTIONALIZED ACCELERATING RESINS DERIVED FROM RENEWABLE MATERIALS

BACKGROUND

Field

The invention relates generally to the preparation of functionalized accelerating resins derived from renewable materials and compositions made therefrom. More particularly, the invention relates to the preparation of functionalized resins prepared from renewable resources which contain a polymerization accelerator group built into the polymer and curable compositions made therefrom.

Brief Description of Related Technology

There is a current emphasis on renewable sources for materials, particularly as a means of replacing petroleum-based products. A number of companies have focused on modifying plant oils to include functional groups which are useful for further reactions and producing polymer materials. For example, U.S. Pat. No. 6,891,053 discloses a method of making oleochemical oil-based polyols by mixing an epoxidized oleochemical, such as a vegetable or animal fat, and an alcohol using an activated or acid leached-clay to form the oleo-chemical oil-based polyol. U.S. Pat. Nos. 8,757,294 and 8,575,378 disclose other methods of making modified plant-based polyols by using a plant oil which includes at least one C=C group and reacting that group with a nucleophilic functional group and an active hydrogen group. The result is specific plant oils which have hydroxyl functionalization useful for further reaction, such as the reaction with an amine compound to form a polyurethane.

Recently, commercially available modified plant oils having hydroxyl functionality have been commercially available as renewable sources for making materials. For example, several soy-based polyols sold under the brand Agrol by Biobased Technologies, Springdale, Ariz., are disclosed as being useful sources of renewable polyols which may be used for making polyurethanes.

There is need for a process which uses renewable materials such as plant oils to form polyurethane polymers which contain a variety of functionalities and which contain a bound accelerating group, i.e. a polymerization accelerator group built into the polymer.

SUMMARY

In one aspect of the invention, a polymerizable resin is formed which includes: a polymerizable polymer corresponding to the structure:

MA-U-A-U-MA where A includes an oleaginous backbone derived from hydroxylated plant oil, U includes a hydrocarbyl linker off of which is a group comprising a urethane linkage and a polymerization accelerator group and further optionally including a free isocyanate group or hydroxyl group and MA includes a member selected from the group consisting of a (meth)acrylate-containing group, an alkoxy-containing group and combinations thereof.

In another aspect of the invention there is provided a polymerizable resin which includes:

A polyurethane prepared by the reaction product of:

a) an NCO-terminated polymer formed from the reaction of an hydroxylated oleaginous component derived from plant oil, a diisocyanate compound and a polymerization accelerator compound including an aliphatic or aromatic diol compound having an active nitrogen, which diol compound may be optionally substituted; and b) a component selected from an hydroxylated (meth)acrylate monomer, an alkoxy-functionalized monomer, an amine-functionalized compound and combinations, thereof.

In yet another aspect of the invention there is included a method of forming a polyurethane polymer from a renewable source, said polyurethane polymer being (meth)acrylate functionalized and/or alkoxy functionalized, said method including:

a) forming a polyurethane polymer by reacting an hydroxylated oleaginous component derived from plant oil with a diisocyanate compound and a polymerization accelerator compound which includes an aliphatic or aromatic diol compound having an active nitrogen, which diol compound may be optionally substituted; and b) reacting said polyurethane polymer with (i) a (meth)acrylate monomer containing hydroxyl functionality to yield said curable (meth)acrylate-functionalized polyurethane polymer; or (ii) reacting said polyurethane with an alkoxy monomer containing amine and/or isocyanate functionality to yield said curable alkoxy-functionalized monomer.

In yet another aspect of the invention there is provided a polymerizable resin which includes:

a) polymer corresponding to the structure:

MA-U-A-U-MA where A includes an oleaginous backbone derived from hydroxylated plant oil, U includes a hydrocarbyl linker off of which is a group including a urethane linkage and a polymerization accelerator group and further optionally including a free isocyanate group or hydroxyl group and MA includes a (meth)acrylate-containing group optionally containing one or more moisture curable groups;

b) a cure system selected from a free radical initiator system, a moisture cure system, and combinations thereof.

In another aspect of the invention there is provided a method for forming a polymerizable (meth)acrylate-functionalized polyurethane polymer which includes, reacting (i) a (meth)acrylate-functionalized isocyanate compound, (ii) an aliphatic or aromatic diol compound having an active nitrogen, which diol compound may be optionally substituted and (iii) an hydroxylated oleaginous compound derived from a renewable source, said reacting being conducted for a time and at a temperature sufficient to form a polymerizable (meth)acrylate-functionalized polyurethane compound containing a polymerization accelerator group.

In another aspect of the invention there is provided a method for forming a polymerizable alkoxy-functionalized polyurethane polymer including, reacting (i) an alkoxy-functionalized isocyanate compound, (ii) an aliphatic or aromatic diol compound having an active nitrogen, which diol compound may be optionally substituted and (iii) a hydroxylated oleaginous compound derived from a renewable source, said reacting being conducted for a time and at a temperature sufficient to form a polymerizable alkoxy-functionalized polyurethane compound containing a polymerization accelerator group.

In yet another aspect of the invention there is provided a method of forming a curable polyurethane polymer from a renewable source which includes:

a) forming a polyurethane polymer by reacting an hydroxylated oleaginous component derived from a plant oil with a diisocyanate containing one or more alkoxy $C_{1-4}$ groups, and a polymerization or accelerator groups including an aliphatic or aromatic diol compound containing an active nitrogen, which diol compound may be optionally substituted; and b) further reacting said polyurethane polymer with compound containing a reactive amino group and a moisture curing group.

DETAILED DESCRIPTION

The present invention provides new processes and curable polymers/compositions using bio-based polyol materials, such as plant oils. Plant oils generally require modification to include hydroxyl groups in their chemical structure, and such products are currently commercially available. The present invention includes the use of such bio-based polyols via a method which includes first reacting the bio-based polyol with a diisocyanate and a polymerization accelerator compound and then further reacting the resultant product with a hydroxyl-containing (meth)acrylate, to yield a (meth)acrylated polyurethane. Moreover, additional modifications of the bio-based polyol may be made such that NCO groups and/or hydroxyl groups or moisture curable groups, such as alkoxy groups $C_{1-4}$, may be incorporated into the bio-based polyol. In such cases, the resultant polyurethane formed therefrom may also have moisture curing capability.

A variety of renewable hydroxylated plant oils (also known as bio-based polyols) may be used in the present invention. For example, oils such as soybean oil almond oil, canola oil, coconut oil, cod liver oil, corn oil, cottonseed oil, flaxseed oil, linseed oil, olive oil, palm oil, peanut oil, safflower oil, sesame oil, sunflower oil, walnut, castor oil and combinations thereof, may be used.

Among the preferred renewable hydroxylated plant oils are those commercially under the trade name Agrol, sold by Biobased Technologies, Springdale, Ariz., as further described herein. The Agrol polyols are hydroxylated soybean oils, which are derived for natural soybean. The degree of hydroxylation may vary and hydroxyl values from 70 to 200 mg KOH/g may be employed. The viscosity of these soybean-derived polyols may vary from about 200 to about 3,000 at 25° C. and hydroxyl functionality can range from 1.7 to 7.0 eq/mol.

Diisocyanates useful in the present invention include, without limitation, isophorone diisocyanate (IPDI), IPDI isocyanurate, polymeric IPDI, naphthalene 1,5-diisocyanate (NDI), methylene bis-cyclohexylisocyanate, methylene diphenyl diisocyanate (MDI), polymeric MDI, toluene diisocyanate (TDI), isocyanurate of TDI, TDI-trimethylolpropane adduct, polymeric TDI, hexamethylene diisocyanate (HDI), HDI isocyanurate, HDI biurate, polymeric HDI, xylylene diisocyanate, hydrogenated xylylene diisocyanate, tetramethyl xylylene diisocyanate, p-phenylene diisocyanate, 3,3'-dimethyldiphenyl-4,4'-diisocyanate (DDDI), 2,2,4-trimethylhexamethylene diisocyanate (TMDI), norbornane diisocyanate (NDI), and 4,4'-dibenzyl diisocyanate (DBDI). Combinations of diisocyanates may also be used. Monoisocyanates may also be used in the present invention.

Among the useful polymerization accelerator compounds that may be incorporated into the resulted inventive polyurethanes include aliphatic or aromatic diol compounds having an active nitrogen compound, which compounds may be substituted. Such compounds may be represented by the general structures

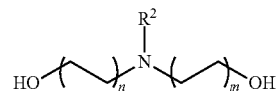

where $R^2$ is a hydrocarbyl group $C_{1-20}$, which may be optionally substituted, and n and m are each 1-13.

Particularly useful accelerators which may be incorporated into the inventive resins include:

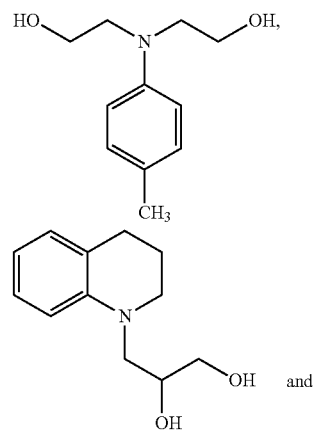

Tetrahydroquinoline-N-
2,3-dihydroxypropane
(THQ-diol)

Among the useful (meth)acrylate-containing hydroxyl compounds useful for reaction with the NCO functionalized bio-based polyols include, without limitation, 2-hydroxyethyl methacrylate, 2-hydroxyethyl acrylate, 3-hydroxypropyl methacrylate, 3-hydroxypropyl acrylate, 2-hydroxypropyl acrylate, 4-hydroxybutyl acrylate, 3-hydroxybutyl acrylate, 2-hydroxybutyl acrylate, 3-(acryloyloxy)-2-hydroxypropyl methacrylate, 2-isocyanatoethyl methacrylate, 2-isocyanatoethyl acrylate, and poly(propylene glycol) (meth)acrylate.

As mentioned herein, when the bio-based polyol also includes other reactive groups such a NCO groups or hydroxyl groups, resultant polyurethanes formed therefrom may have these groups available for further reactions. Thus, the inventive polyurethanes formed from the bio-based polyols used in the present invention allow for a variety of polyurethane end products having such functionalities as (meth)acrylate functionality, which in turn allows for free radical curing mechanisms to be employed in the final curable compositions made therefrom.

A variety of curable compositions may be made from the polyurethanes of the invention. For example, adhesive compositions, sealants and coatings are among the useful products which may be formed from the inventive renewable compositions.

The polyurethane compositions of the present invention may be incorporated into curable compositions having free radical, and/or UV cure mechanisms.

When incorporated into compositions which cure via free radical mechanisms, the compositions will usually include a free radical initiator. Examples of useful free radical initiators include, without limitation, hydroperoxides, such as cumene hydroperoxide, paramenthane hydroperoxide, tertiary butyl hydroperoxide, and peresters which hydrolyze to peroxides such as tertiary butyl perbenzoate, and the like. The amount of such peroxy compounds may vary from about 0.1 to about 10, preferably about 1 to about 5, percent by weight of the total composition.

When incorporated into compositions which photocure, the compositions will usually include a photoinitiator. Useful photoinitiators include, without limitation, 1-hydroxycyclohexyl phenyl ketone, 2-methyl-1-[4-(methylthio)phenyl]-2-morpholino propan-1-one, 2-benzyl-2-N,N-dimethylamino-1-(4-morpholinophenyl)-1-butanone, the combination of 1-hydroxy cyclohexyl phenyl ketone and benzophenone, 2,2-dimethoxy-2-phenyl acetophenone, the combination of bis(2,6-dimethoxybenzoyl-2,4,4-trimethyl pentyl) phosphine oxide and 2-hydroxy-2-methyl-1-phenyl-propan-1-one, and [bis (2,4,6-trimethyl benzoyl) phenyl phosphine oxide], 2-hydroxy-2-methyl-1-phenyl-1-propan-1-one, the combination of 2,4,6-trimethylbenzoyldiphenylphosphine oxide and 2-hydroxy-2-methyl-1-phenyl-propan-1-one, dl-camphorquinone, alkyl pyruvates, 2,2-dimethoxy-2-phenyl acetophenone, 2-hydroxy-2-methyl-1-phenyl-1-propane, bis(2,4,6-trimethyl benzoyl) phenyl phosphine oxide, bis(2,6-dimethoxybenzoyl-2,4,4-trimethylpentyl) phosphine oxide, 2-hydroxy-2-methyl-1-phenyl-propan-1-one, bis($n^5$-2,4-cyclopentadien-1-yl)-bis[2,6-difluoro-3-(1H-pyrrol-1-yl)phenyl]titanium, diethoxyacetophenone and combinations thereof. Photoinitiators may be used in amount of about 0.001% to about 2.0% by weight of the total composition.

Accelerators may also be advantageously included. Such accelerators include a variety of secondary and tertiary organic amines as well as sulfimides (e.g., benzoic sulfimide) which are also known in the art. These may be used at a concentration range of about 0.1 to about 5, desirably about 1 to about 2, percent by weight of the total composition.

Other agents such as thickeners, plasticizers, etc., are also known in the art and may advantageously be incorporated where functionally desirable, provided only that they do not interfere with the functioning of the additive for its intended purpose.

Preparation of Curable Functionalized Polyurethane Polymers

In a method of the present invention, a hydroxylated oleaginous component derived from plant oil is reacted with a diisocyanate and a polymerization accelerator compound comprising an aliphatic or aromatic diol compound having an active nitrogen, which compound may be substituted, to form a polyurethane intermediate containing a bound polymerization accelerator group. The stoichiometry of the reactants is controlled such that the polyurethane intermediate contains unreacted pendent NCO groups, intended to be used for further reaction. That is, pendent NCO groups remain on the polyurethane intermediate for further reaction with, for example, a hydroxyl containing (meth)acrylate component, a polyfunctional alcohol component, or an alkoxy-containing amine component. The amount of residual NCO may be about 5 to 90 wt %, to preferably 25 to 70 wt %, and more preferably 30 to 60%.

The equivalents ratio of OH to NCO in the starting reactants diisocyanate components) is about desirably 0.99 to about 0.10, more desirably about 0.7 to 0.2, and even more desirably about 0.6 to about 0.5 equivalents of OH to NCO. The reaction is run in a reactor with or without a suitable solvent. When solvents are employed, polar solvents such as toluene, tetrahydrofuran (THF), ethyl acetate, xylenes, and the like may be employed. The reaction is generally run at temperatures of about 25° C. to about 100° C., desirably about 40° C. to about 80° C., and more desirably about 60° C. to about 75° C. Metal-based catalysts, such as dibutyltin dilaurate (among others, as further described herein), may be used in amounts of about 0.01% to about 5%, desirably 0.5% to about 2%, and more desirably about 0.1% to about 1.0%, based on the weight of the total reaction mixture. The reaction is carried out for as long as required to substantially fully react the hydroxyl groups with NCO groups. The reaction times may vary from about 2 to about 24 hours, desirably 3 to 12 hours, and more desirably 4 to 8 hours. Due to the excess NCO groups present in the reaction, the formed intermediate polyurethane will contain pendent NCO groups which are available for reaction with additional components. One particularly desirable further reaction includes the reaction of the intermediate polyurethane with an hydroxyl-containing (meth)acrylate component (e.g. 2-hydroxyethyl methacrylate (HEMA)), to yield curable (meth)acrylate-functionalized polyurethane polymers. Desirably the equivalents ratio of NCO:OH in the reaction of the intermediate polyurethane with the hydroxyl-containing (meth)acrylate component is about 1:0.01 to about 1:1.2. This reaction yields a curable (meth)acrylate-functionalized polyurethane polymer useful for a variety of applications as previously mentioned. The reaction of the intermediate polyurethane with the hydroxyl-containing (meth)acrylate component is carried out for as long as required to fully react the isocyanate and hydroxyl groups. Typically, the reaction time may range from about 2 to about 12 hours, preferably about 3 to about 12 hours, and more preferably 4 to 8 hours.

The amount of renewable content present in the intermediate and final polymers made in accordance with the present invention may range from about 30% to about 70% by weight, more desirably about 45% to about 60% by weight. Due to the selection of the specific hydroxylated oleaginous material, the end products formed may contain a hard (relatively rigid) segment (attributed to the reaction of the diisocyanate with short chain diols present in the hydroxylated oleaginous materials) of about 1 to about 10% and desirably about 2% to about 5% by weight.

Another particularly useful method of preparing the polyurethanes of the present invention include the following reaction steps:

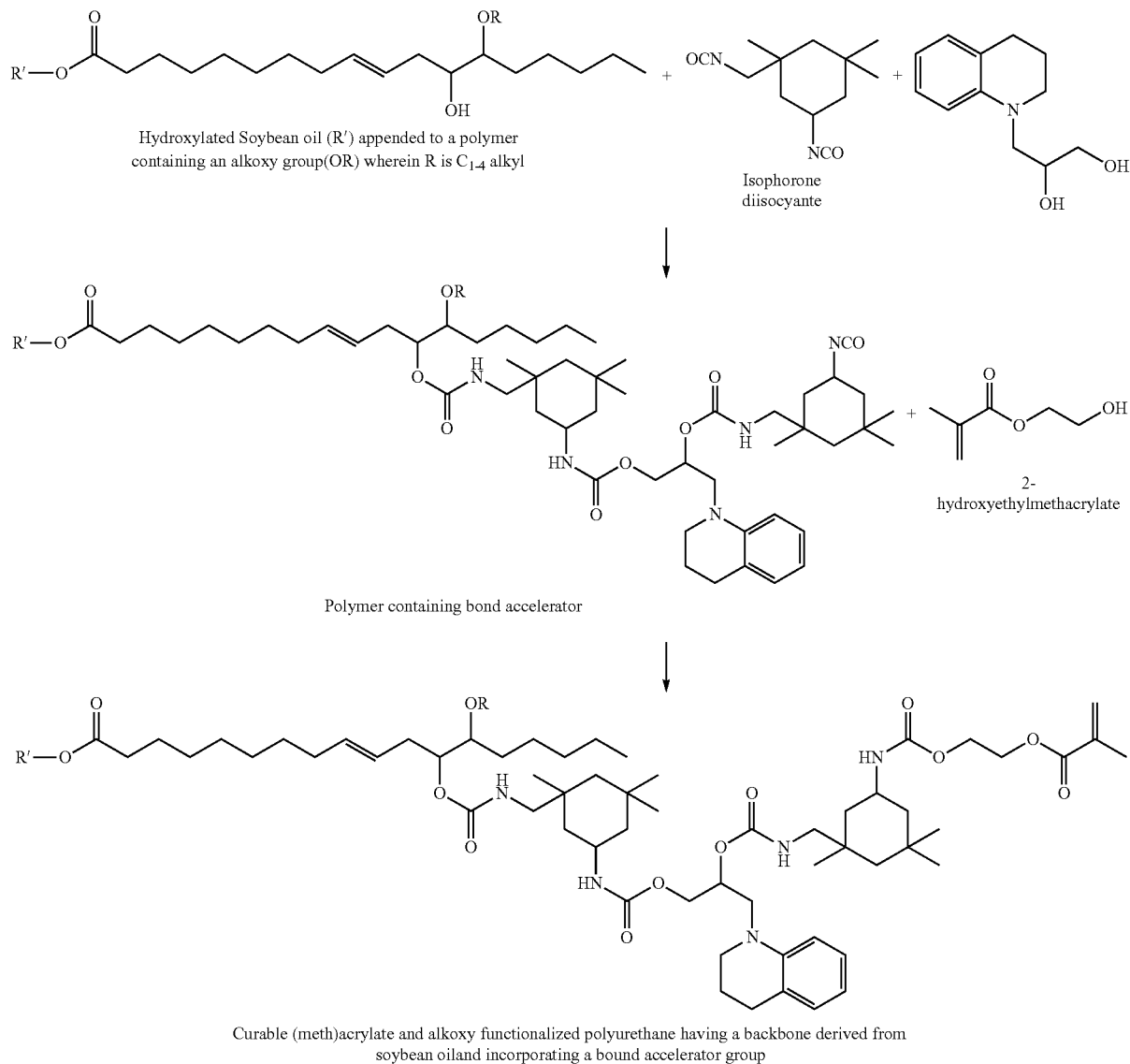

Curable (meth)acrylate and alkoxy functionalized polyurethane having a backbone derived from soybean oil and incorporating a bound accelerator group

EXAMPLES

Agrol 2.0 is the trade name for a hydroxylated soybean oil derived from natural soybean having hydroxyl values of 65-75, an acid value (mg KOH/g)≤1.0, and a viscosity of about 233 at 25° C., and is available from BioBased Technologies, Springdale, Ariz.

Agrol 3.6 is the trade name for a hydroxylated soybean oil derived from natural soybean having hydroxyl values of 107-117, an acid value (mg KOH/g)≤1.0, and a viscosity of about 720 at 25° C., and is available from BioBased Technologies, Springdale, Ariz.

Pomoflex 6156 is a bio-based polyol derived from succinic acid and propane diol made by Piedmont Chemical Industries I, LLC, 331 Burton Avenue, High Point, N.C. 27262. It has a molecular weight of about 2,000, a functionality of 2.0, a hydroxyl number of 56 mg KOH/g, and an acid value (mg KOH/g)≤1.

Example 1

Preparation of a Curable (Meth)Acrylate-Functionalized Agrol 4.0 Based Polyurethane Resin with 3% Accelerating Diol Extended with IPDI (OH:NCO=1.0:1.72)

To a 2-L jacketed polymerization reactor equipped with a thermocouple, stirrer, condenser, and nitrogen inlet/outlet was added Agrol 4.0 (300.00 g, 0.199 moles), 1,2-Propanediol, 3-(3,4-dihydro-1(2H)-quinolinyl)- (17.38 g, 0.084 moles), dibutyltin dilaurate (0.58 g, 0.001 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl] propyl] ester (0.07 g, 0.00006 moles), and 4-methoxyphenol (0.07 g, 0.0006 moles). The contents were heated to 60° C. and allowed to mix for 15 minutes. Isophorone diisocyanate (176.59 g, 0.794 moles) was added and allowed to react for +3 hours. A titration is then performed to determine the residual isocyanate content. Hydroxyethylmethacrylate (71.41 g, 0.548 moles, 1:1 residual NCO:OH equivalents) was then added and allowed to mix for +3 hours at 60° C.

The methacrylated polyurethane accelerating resin was dropped (535.2 g, 94.5% yield) to yield a clear, yellow, and viscous resin.

Example 2

Preparation of a Curable (Meth)Acrylate-Functionalized Agrol 4.0 Based Polyurethane Resin with 3% Accelerating Diol Extended with IPDI (OH:NCO=1.0:2.0)

Agrol 4.0 (136.00 g, 0.090 moles), 1,2-Propanediol, 3-(3, 4-dihydro-1(2H)-quinolinyl)-(9.51 g, 0.046 moles), dibutyltin dilaurate (0.30 g, 0.0005 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.30 g, 0.00025 moles), and 4-methoxyphenol (0.30 g, 0.0024 moles) is added to a 2-L jacketed polymerization reactor equipped with a thermocouple, stirrer, condenser, and nitrogen inlet/outlet. The contents are heated to 60° C. and allowed to mix for 15 minutes. Isophorone diisocyanate (96.66 g, 0.426 moles) is then added and allowed to react for +3 hours. A titration is then performed to determine the residual isocyanate content. Hydroxyethylmethacrylate (55.46 g, 0.426 moles, 1:1 residual NCO:OH equivalents) is then added and allowed to mix for +3 hours at 60° C. The methacrylated polyurethane accelerating resin was dropped (291.2 g, 97.5% yield) to yield a clear, yellow, and viscous resin.

Example 3

Preparation of a Curable (Meth)Acrylate-Functionalized Agrol 5.6 Based Polyurethane Resin with 3% Accelerating Diol Extended with IPDI (OH:NCO=1.0:2.0)

Agrol 5.6 (132.40 g, 0.067 moles), 1,2-propanediol, 3-(3, 4-dihydro-1(2H)-quinolinyl)-(9.32 g, 0.045 moles), dibutyltin dilaurate (0.31 g, 0.0005 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.46 g, 0.00039 moles), and 4-methoxyphenol (0.46 g, 0.0037 moles) is added to a 2-L jacketed polymerization reactor equipped with a thermocouple, stirrer, condenser, and nitrogen inlet/outlet. The contents are heated to 60° C. and allowed to mix for 15 minutes. Isophorone diisocyanate (106.96 g, 0.472 moles) is then added and allowed to react for +3 hours. A titration is then performed to determine the residual isocyanate content. Hydroxyethylmethacrylate (61.37 g, 0.471 moles, 1:1 residual NCO:OH equivalents) is then added and allowed to mix for +3 hours at 60° C. The methacrylated polyurethane accelerating resin was dropped (304.9 g, 97.9% yield) to yield a clear, yellow, and viscous resin.

Example 4

Preparation of a Curable (Meth)Acrylate-Functionalized Pomoflex 61112 Based Polyurethane Resin with 3% Accelerating Diol Extended with IPDI (OH:NCO=1.0:2.0)

Pomoflex 61112 (115.24 g, 0.115 moles), 1,2-propanediol, 3-(3,4-dihydro-1(2H)-quinolinyl)-(6.70 g, 0.032 moles), dibutyltin dilaurate (0.23 g, 0.0004 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.23 g, 0.00019 moles), and 4-methoxyphenol (0.23 g, 0.0018 moles) is added to a 2-L jacketed polymerization reactor equipped with a thermocouple, stirrer, condenser, and nitrogen inlet/outlet. The contents are heated to 60° C. and allowed to mix for 15 minutes. Isophorone diisocyanate (68.08 g, 0.300 moles) is then added and allowed to react for +3 hours. A titration is then performed to determine the residual isocyanate content. Hydroxyethylmethacrylate (39.06 g, 0.300 moles, 1:1 residual NCO:OH equivalents) is then added and allowed to mix for +3 hours at 60° C. The methacrylated polyurethane accelerating resin was dropped (218.5 g, 95.1% yield) to yield a clear, yellow, and viscous resin.

Example 5

Preparation of a Curable (Meth)Acrylate-Functionalized Agrol 4.0 Based Polyurethane Resin with 1.5% Accelerating Diol Extended with IPDI (OH:NCO=1.0:2.0)

Agrol 4.0 (145.60 g, 0.097 moles), 1,2-propanediol, 3-(3, 4-dihydro-1(2H)-quinolinyl)-(4.40 g, 0.021 moles), dibutyltin dilaurate (0.30 g, 0.0005 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.30 g, 0.00025 moles), and 4-methoxyphenol (0.30 g, 0.0024 moles) is added to a 2-L jacketed polymerization reactor equipped with a thermocouple, stirrer, condenser, and nitrogen inlet/outlet. The contents are heated to 60° C. and allowed to mix for 15 minutes. Isophorone diisocyanate (90.82 g, 0.400 moles) is then added and allowed to react for +3 hours. A titration is then performed to determine the residual isocyanate content. Hydroxypropylmethacrylate (57.71 g, 0.400 moles, 1:1 residual NCO:OH equivalents) is then added and allowed to mix for +3 hours at 60° C. The methacrylated polyurethane accelerating resin was dropped (285.4 g, 95.3% yield) to yield a clear, yellow, and viscous resin.

The invention claimed is:

1. A polymerizable polymer corresponding to the following structure:

MA-U-A-U-MA wherein A comprises an oleaginous backbone derived from hydroxylated plant oil that is selected from the group consisting of hydroxylated soybean oil, hydroxylated almond oil, hydroxylated canola oil, hydroxylated coconut oil, hydroxylated corn oil, hydroxylated cottonseed oil, hydroxylated flaxseed oil, hydroxylated linseed oil, hydroxylated olive oil, hydroxylated palm oil, hydroxylated peanut oil, hydroxylated safflower oil, hydroxylated sesame oil, hydroxylated sunflower oil, hydroxylated walnut oil, and combinations thereof, U comprises a hydrocarbyl linker that is bound to a group comprising both a urethane linkage and a polymerization accelerator group and further optionally comprising a free isocyanate group or hydroxyl group, and MA comprises an alkoxy-containing group derived from a reactant selected from the group consisting of 3-isocyanatopropyltriethoxysilane, 3-isocyanatopropylmethyldiethoxysilane, 3-isocyanatopropyldimethylethoxysilane, 3-isocyanatopropyltrimethoxysilane, 3-isocyanatopropylmethyldimethoxysilane, 3-isocyanatopropyldimethylmethoxysilane, 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-amino-3,3-dimethylbutylmethyldimethoxysilane, dimethylbutyltrimethoxysilane, 1-amino-2-(dimethylethoxysilyl)propane, 3-(m-aminophenoxy)propyltrimethoxysilane, m-aminophenyltrimethoxysilane, m-aminophenyltriethoxysilane, 3-aminopropyltriethoxysilane, 3-aminopropylmethyldiethoxysilane, 3-aminopropyldimethyethoxysilane, 3-aminopropyltrimethoxysilane, 3-aminopropylmethyldimethoxysilane, 3-aminopropyldimethymethoxysilane, 3-aminopropylmethylbis(trimethylsiloxy)silane, 3-aminopropylpentamethyldisiloxane, 11-aminoundecyltriethoxysilane, and 11-aminoundecyltrimethoxysilane, wherein the polymerizable polymer comprises about 45% to about 60% by weight of renewable content.

2. The polymerizable polymer of claim 1, wherein the hydroxylated plant oil has a hydroxyl functionality from about 1.0 to about 7.0.

3. The polymer of claim 1, wherein U is derived from a diisocyanate reactant selected from the group consisting of isophorone diisocyanate (IPDI), IPDI isocyanurate, polymeric IPDI, naphthalene 1,5-diisocyanate (NDI), methylene bis-cyclohexylisocyanate, methylene diphenyl diisocyanate (MDI), polymeric MDI, toluene diisocyanate (TDI), isocyanurate of TDI, TDI-trimethylolpropane adduct, polymeric TDI, hexamethylene diisocyanate (HDI), HDI isocyanurate, HDI biurate, polymeric HDI, xylylene diisocyanate, hydrogenated xylylene diisocyanate, tetramethyl xylylene diisocyanate, p-phenylene diisocyanate, 3,3'-dimethyldiphenyl-4,4'-diisocyanate (DDDI), 2,2,4-trimethylhexamethylene diisocyanate (TMDI), norbornane diisocyanate (NDI) and 4,4'-dibenzyl diisocyanate (DBDI).

4. The polymer of claim 1, wherein the polymerization accelerator group bound to the hydrocarbyl linker of U is derived from a reactant which is an aliphatic or aromatic diol compound having an active nitrogen, which diol compound may be optionally substituted.

5. The polymer of claim 1, wherein the polymerization accelerator group bound to the hydrocarbyl linker of U is derived from a reactant which has the structure:

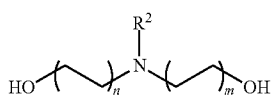

wherein $R^2$ is a hydrocarbyl group $C_{1-20}$ which may be optionally substituted and may contain heteroatoms S or N; and n and m are each 1-13.

6. The polymer of claim 4, wherein the polymerization accelerator group is a residue of the structure:

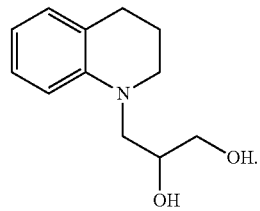

Tetrahydroquinoline-N-
2,3-dihydroxypropane
(THQ-diol)

7. The polymer of claim 4, wherein the polymerization accelerator group is a residue of one of the structures:

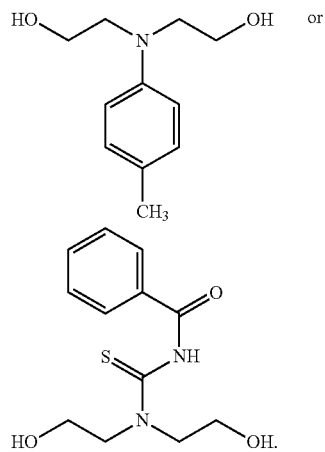

8. A curable adhesive, sealant or coating composition comprising the polymer of claim 1 and a cure system selected from the group consisting of a free radical initiator system, a moisture cure system and combinations thereof.

* * * * *

UNITED STATES PATENT AND TRADEMARK OFFICE
CERTIFICATE OF CORRECTION

| | |
|---|---|
| PATENT NO. | : 11,401,367 B2 |
| APPLICATION NO. | : 16/002488 |
| DATED | : August 2, 2022 |
| INVENTOR(S) | : Andrew D. Messana et al. |

It is certified that error appears in the above-identified patent and that said Letters Patent is hereby corrected as shown below:

In the Specification

Column 7, formula 3 change "oiland" to --oil and--.

Signed and Sealed this
Twenty-eighth Day of March, 2023

Katherine Kelly Vidal
*Director of the United States Patent and Trademark Office*